Patented Feb. 1, 1949

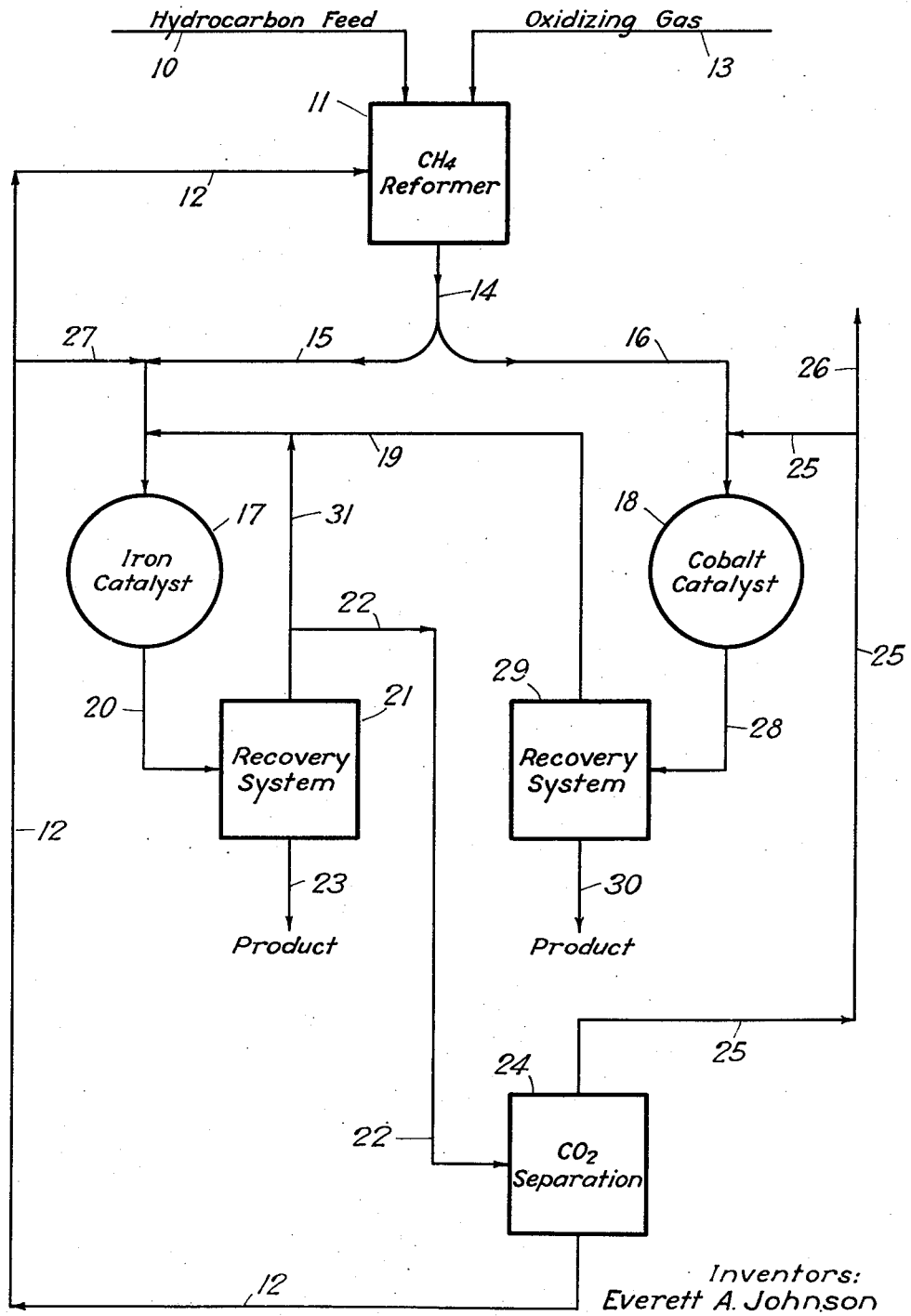

2,460,508

UNITED STATES PATENT OFFICE 2,460,508

METHOD AND MEANS FOR HYDROCARBON SYNTHESIS

Everett A. Johnson, Park Ridge, and Sam B. Becker, Chicago, Ill., assignors to Standard Oil Company, Chicago, Ill., a corporation of Indiana Application July 30, 1946, Serial No. 687,064

2 Claims. (Cl. 260—449.6)

This invention relates to the synthesis of hydrocarbons having more than one carbon atom in the molecule and it pertains more particularly to an improved method and means for producing normally liquid hydrocarbons by reacting hydrogen and carbon monoxide over catalysts under optimum conditions. More specifically it relates to hydrocarbon synthesis with methane as the raw material.

When methane from natural gas is reformed by direct combustion with oxygen, a certain amount of excess heat is available especially if the feed gases are preheated to temperatures of about 1000° F. or higher and the reforming carried out in the presence of a catalyst. Carbon dioxide can be incorporated in the feed gas in quantities sufficient to absorb excess heat by reacting it endothermically with a portion of the natural gas. The incorporation of carbon dioxide in the feed gas not only simplifies the design of the reformer by making the operation thermally balanced, but also increases the overall carbon efficiency of the process. Consequently from the standpoint of thermal and carbon efficiency it is desirable to feed to the reforming operation a gas comprising methane, oxygen and carbon dioxide.

However, when methane, oxygen and carbon dioxide in the proper proportions are reformed catalytically at relatively high temperatures, the make gas produced is not ideally suited for the synthesis reaction using either cobalt catalyst, for which it is deficient in hydrogen, or for synthesis using iron catalyst, for which it is deficient in carbon monoxide. The operation of a cobalt catalyst unit and an iron catalyst unit in parallel is highly advantageous since much dual operation permits a unique cross-recycle of the unconverted gas which then provides make gas very nearly ideal for both types of catalyst.

At least a part of the unconverted gas from the iron catalyst synthesis which is rich in hydrogen can be blended with a first portion of the make gas from the reforming unit giving a gas composition more nearly ideal for the cobalt catalyst operation. Likewise, at least a part of the unconverted gas from the cobalt catalyst synthesis can be blended with a second portion of the make gas from the reforming unit giving a gas composition very nearly ideal for the iron catalyst operation.

When make gas having hydrogen and carbon monoxide in the ratio of about 1:1 is contacted with an iron type catalyst under suitable operating conditions of temperature and pressure, a considerable proportion of the reaction product is olefinic but the extent of conversion is relatively low.

The formation of hydrocarbons by contacting make gas with a cobalt type catalyst requires a make gas mixture which contains hydrogen and carbon monoxide in the ratio of about 2 to 1 in order to obtain the desired products. However, even under optimum conditions, a substantial proportion of the carbon monoxide remains unconverted to recoverable hydrocarbon rich in olefins. It is, therefore, another object of this invention to provide a process for increasing the carbon monoxide conversion and to increase the yield of hydrocarbons from a given make gas mixture.

In the synthesis of hydrocarbons from make gas by means of an iron catalyst the reaction takes place largely in accordance with the following equation:

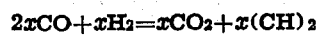
$$2xCO + xH_2 = xCO_2 + x(CH)_2$$

In this reaction one-half the volume of hydrogen based upon carbon monoxide is consumed so that the residual make gas has a higher proportion of hydrogen than the fresh feed. With the use of higher hydrogen to carbon monoxide ratios the following average reaction occurs:

$$3xCO + 3xH_2 = 2C_xH_{2x} + xH_2O + xCO_2$$

In the conversion of make gas over a cobalt type catalyst the reaction is principally in accordance with the following equation:

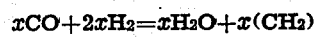
$$xCO + 2xH_2 = xH_2O + x(CH_2)$$

Therefore, in this reaction about twice the volume of hydrogen per volume of carbon monoxide is consumed.

The term "make gas" as used herein refers to gases containing carbon monoxide and hydrogen. The normal make gas prepared by the reforming of methane by conventional methods contains carbon monoxide and hydrogen in the ratio of between about 1 to 1 and 3 or 4 to 1. The hydrogen ratio in the gas from a thermally balanced reforming operation in which the feed gases comprising $CH_4$, $CO_2$ and $O_2$ is usually within the range of 7 to 4 and 5 to 4. In general the higher the thermal efficiency and the higher the temperature to which the gases are preheated, the more $CO_2$ can be consumed and the lower the hydrogen to carbon monoxide ratio. However, such a make gas ordinarily is not suitable for the synthesis of optimum quantities of liquid hydrocarbons over either iron or cobalt catalysts, and it has heretofore been necessary to alter the proportions of hydrogen to carbon monoxide in the make gas depending upon whether an iron or cobalt type catalyst is to be used. Such treatment of the make gas obviously complicates the system and increases the cost of the product.

Therefore, a further object of this invention is to provide a system adapted to produce increased quantities of useful hydrocarbons and chemicals from a given make gas. Another object is to provide an improved system for the optimum utilization of hydrogen and carbon monoxide produced by the reforming of methane. Another object is to provide an improved system for the optimum utilization of hydrogen and carbon monoxide produced by the reforming of methane. Another object is to produce a uniquely integrated system wherein substantially complete cleanup of carbon monoxide is obtained. A more specific object of our invention is to provide a multiple catalyst system wherein a single supply of make gas is utilized to produce optimum quantities of the desired product. These and other objects of the invention will become apparent to those skilled in the art as the description of our invention proceeds.

Briefly, our invention contemplates dividing a stream of make gas having a hydrogen to carbon monoxide ratio which is optimum neither for iron type catalyst nor cobalt type catalyst and supplying substantially equal parts of the make gas stream to separate parallel reaction zones. In one zone is provided a cobalt type catalyst and in the other is an iron type catalyst. In the cobalt synthesis zone a substantial proportion of carbon monoxide is unconverted and this carbon monoxide is used to supplement the make gas fed to the iron catalyst synthesis. On the other hand, substantially complete cleanup of carbon monoxide is obtained in the iron catalyst synthesis and there is an increased proportion of hydrogen in the unconverted gases. Another product of the iron catalyst synthesis is carbon dioxide which is separated and can be recycled to the methane reformer which produces the initial make gas. The unconverted hydrogen recovered from the iron catalyst synthesis can be used to supplement the make gas supplied to the cobalt catalyst synthesis bringing the feed within the optimum proportions of hydrogen to carbon monoxide for the cobalt synthesis. Thus, a system is provided for maximum hydrogen consumption over cobalt catalyst, maximum carbon monoxide cleanup in iron catalyst synthesis and maximum utilization of carbon dioxide in reforming additional quantities of methane.

An essential feature of the process is that the make gas which is not particularly suitable for either cobalt synthesis or iron synthesis is rendered useful in an exceptionally convenient and economical manner.

The hydrogen-carbon monoxide mixture can be suitably obtained from natural gas (which may consist chiefly of methane) as the raw material. However, my invention is not limited to the source of the carbon monoxide-hydrogen mixture and may be obtained for example from coal, shale, tars, or other carbonaceous materials.

The basic equations for the gas reforming operation using methane may be somewhat as follows:

(a) $CH_4 + CO_2 = 2CO + 2H_2$
(b) $CH_4 + .5O_2 = CO + 2H_2$

The recycle gas of course contains ethane and ethylene as well as methane and unreacted make gas but the reaction of these hydrocarbons is similar to that indicated above. The proportions of carbon dioxide and steam and/or oxygen containing gas can in any case be so adjusted to give the desired make gas.

The natural gas can be first freed of hydrogen sulfide or organic sulfur compounds, for example by scrubbing with a suitable solvent, followed if necessary by scrubbing with a strong caustic solution. Likewise, the gases may be desulfurized by contacting with "luxmasse." The desulfurized gas is then mixed with such proportions of carbon dioxide and oxygen and/or steam to give a gas mixture having an atomic hydrogen: carbon:oxygen ratio of about 4:1:1. The feed can be preheated to above about 900° F. or an excess of oxygen can be supplied to the reformer as described below. This mixture is then contacted with a reforming catalyst preferably with an VIIIth group metal which may be supported on clay, kieselguhr, silica gel, alumina, etc. Such a catalyst for instance may be a mixture of oxides of nickel, iron and megnesium with the proportions 1:1:0.5, respectively. The nickel or VIIIth group metal catalyst may be promoted by oxides of aluminum, magnesium, calcium, cerium, chromium, molybdenum, vanadium, etc.

The space velocity through the reforming catalyst should be sufficient to give a contact time of between about 2 and 60 seconds, preferably between about 10 and 30 seconds. The temperature of this operation is preferably between about 1400 and about 1800° F. and the pressure may be about atmospheric to 300 pounds per square inch or higher. If the natural gas is reformed without a catalyst, temperatures of above about 2000° F. are used. This reforming operation converts the methane-carbon dioxide-steam or oxygen mixture into a gas consisting chiefly of hydrogen and carbon monoxide in the proportions of about 5:3.

Carrying out the process in a practical operation is illustrated by the following description taken with the drawings wherein the process is diagrammatically illustrated. The hydrocarbon charge comprising about 50 million cubic feet per day is supplied through line 10 to the reformer 11, together with carbon dioxide introduced through line 12 and an oxidizing gas which may be oxygen or steam, supplied to the reformer 11 by line 13. The daily charge to the reformer 11 may be substantially as follows:

| | Million cubic feet per day |
|---|---|
| Methane | 50 |
| Carbon dioxide | 10 |
| Oxygen | 21 |

An equivalent amount of oxygen may be supplied as steam which may comprise a portion of the water produced in the synthesis. The utilization of synthesis water is a particularly useful expedient when it is not desired to recover oxygenated compounds from the synthesis product water, the oxygenated compounds being consumed in the production of additional quantities of hydrogen and carbon monoxide.

The raw gas mixture is passed through the reformer 11 at a pressure of between about atmospheric and 300 pounds per square inch, preferably about 250 pounds per square inch and at a temperature of between about 1,400 and 1,800° F., for example, 1,500 to 1,550° F. A space velocity is maintained so as to give a contact time of about 2 to 60 seconds, for example about 10 to 30 seconds. This reforming is thermally balanced if feeds are preheated sufficiently, for example to a temperature of about 1000 to 1200° F. and if outlet temperature is between 1400 and 1600° F. If no catalyst is used, the oxygen or degree of preheating should be increased.

As stated above, the catalyst, when used for this reforming step, may be one or more VIIIth group metals such as nickel, iron, or a mixture of nickel and iron oxide. Such a catalyst may be promoted with the named materials and can be on a suitable finely divided support. However, no invention is claimed in the catalyst per se and since such catalysts are well-known in the art, a further detailed description thereof is not necessary.

Our invention is not limited to this particular make gas system but is applicable to any system producing a make gas wherein the ratio of $H_2$ to CO lies within the range of from 5:4 to 7:4.

The hot make gas withdrawn from the reformer 11 can be cooled by conventional means not illustrated. The make gas, comprising about 160 million cubic feet per day or about 6.6 million cubic feet per hour, and about 110,000 cubic feet per minute, is available in line 14. This make gas is split and separate portions passed by lines 15 and 16 to the iron catalyst synthesis reactor 17 and the cobalt catalyst synthesis reactor 18, respectively. In general, the iron type catalysts operate at higher temperatures and pressures than the cobalt type catalyst.

An active iron type catalyst can be prepared by a number of methods well known in the art and can for example be of the precipitated type supported on super-filtrol or other finely divided inert carriers. Alternatively, an iron catalyst of the type employed in ammonia synthesis can be used, such catalyst ordinarily being prepared by oxidizing iron in a stream of oxygen, fusing the resultant mass and crushing the fused oxide.

A very effective and economical catalyst can be produced by roasting iron pyrites and adsorbing KF thereon. The iron catalyst can be reduced before use, preferable with hydrogen at a temperature of between about 600 and 1,500° F. If desired, however, the make-up catalyst can be supplied to the reactor as the oxide, the oxide undergoing reduction during the synthesis operation. Another method of preparing the catalyst employs the decomposition of iron carbonyl to form an iron powder which may be sintered and ground before activation with hydrogen. Catalyst particles without a support will have a bulk density as high as between about 120–150 pounds per cubic foot, whereas the bulk density of iron catalyst supported on Super Filtrol or similar carrier may be as low as about ten pounds per cubic foot.

The iron type catalyst can be promoted by the addition of between about .5 and about 1.5% alkali metal compound. There is an optimum temperature of reduction of an alkali-promoted catalyst which is dependent upon the amount of alkali present. For example, with about 1% alkali, the optimum temperature for reducing the fluidized catalyst is about 850° F. In general, the optimum reduction temperature at which fluidization can be maintained is lower with the higher proportions of alkali metal compounds.

A cobalt type of catalyst employed in the parallel operation of this invention can consist essentially of supported cobalt metal, either with or without one or more promoters such as oxides of aluminum, cerium, magnesium, manganese, thorium, titanium, uranium, zinc, zirconium, and the like. The cobalt support is preferably an acid-treated bentonite or clay, such as Super Filtrol or other material which is substantially free of any catalyst poison. Other supports include materials such as kaolin, alumina, silica, magnesia, and the like. The catalyst-to-carrier weight ratio can be varied between about 0.1:1 and about 5.0:1. The catalyst may be reduced before use, preferably with hydrogen or hydrogen-rich gas at a temperature of between about 350–500° F. Likewise, the reduction can be effected within the reactor proper on contact with the synthesis gas, which is a reducing medium.

Instead of the cobalt catalyst, we may employ a catalyst of the nickel or ruthenium type. The above catalysts are all known in the art and inasmuch as no invention is claimed in their composition or method of preparation, a further description thereof is not believed necessary.

The synthesis reactors 17 and 18 may contain either fixed bed or fluidized dense phase catalysts and the two parallel reactors need not be of the same type. Thus, for example, the cobalt reactor may contain a fixed bed of catalyst and the iron reactor, a fluidized dense phase catalyst.

If a fluidized dense phase of catalyst is used, the catalyst ordinarily is in a finely divided form so that it can be fluidized by gases flowing upwardly through the bed of the catalyst at low velocities, said catalyst being maintained as a dense turbulent suspended phase. The catalyst particles can be of the order of 2–200 microns, preferably 20–100 microns in particle size. With vertical gas velocities of the order of about 0.5 to 5.0, preferably between about 1 and 4, for example about 2 feet per second, a liquid-like dense phase of catalyst is obtained in which the bulk density is between about 30 and about 90%, preferably between about 40 and 80%, e. g., about 50%, of the density of the settled catalyst material. The vertical velocity of the gases is in any event regulated so as to produce a turbulent suspension of catalyst within the reactor.

The make gas in line 15 is introduced into the iron catalyst synthesis reactor 17 together with residual gases in line 19 from the cobalt catalyst synthesis reactor 18, these residual gases being relatively rich in carbon monoxide.

With iron catalyst a temperature of between about 400 and 750° F. and pressures of between about 75 and 400 pounds per square inch can be used. A preferred range is a temperature between about 450 and 650° F. and a pressure of between about 175 and about 325 pounds per square inch. However, when an iron catalyst, promoted with about 10 weight per cent of copper is used, substantially lower pressures may be employed. The space velocity through the reactor should be between about 1,000 and 10,000 or more volumes of gas per hour per volume of space occupied by the dense catalyst phase within the reactor. If desired, substantial recycle of diluent $CO_2$ can be provided to permit higher hydrogen:carbon monoxide ratios in the make gas passing over the iron catalyst.

The product stream is withdrawn from the reactor 17 through line 20 at about reaction temperature and supplied to a recovery system schematically illustrated at 21. The residual gas mixture predominating in hydrogen and containing carbon dioxide is separated via line 22, and liquid product fractions including hydrocarbons and water are withdrawn by line 23 for further separation or processing. At least a portion of the gases in line 22 can be recycled via line 31 to the iron catalyst synthesis reactor 17. Such recycle of $CO_2$-rich gas has been found to permit optimum carbon utilization over iron catalyst. The remainder of the gases in line 22 can be supplied to a carbon dioxide separation system schematically represented at 24 wherein hydrogen and carbon dioxide are separated. Such separation can be accomplished by scrubbing with monoethanolamine or some other solvent for carbon dioxide. The hydrogen-rich stream is transferred from the carbon dioxide separation zone 24 by line 25 to the cobalt catalyst reactor 18. A portion of this stream can be vented from the system via line 26 and this stream can be utilized as fuel for adding heat to the reformer 11. The carbon dioxide is stripped from the scrubbing medium within the carbon dioxide separation system 24 and passed through line 12 to the reformer 11. Likewise, a portion of the recovered $CO_2$ can be recycled by lines 27 and 15 to the iron catalyst reactor 17 to enhance the conversion of carbon monoxide to hydrocarbons.

The gases in line 25 include hydrogen and carbon monoxide in the ratio of at least 10 to 1 and may be substantially free from carbon monoxide because of the high conversion of carbon monoxide in the iron synthesis catalyst reactor 17. This hydrogen-rich gas stream is commingled with make gas supplied by line 16 whereby the hydrogen-carbon monoxide ratio of the net feed to the cobalt catalyst synthesis zone 18 is substantially increased and this provides maximum hydrogen consumption over a cobalt catalyst.

The catalyst in the cobalt synthesis reactor 18 can be of a precipitated cobalt or nickel type either in a fluidized or stationary bed. The synthesis temperatures can be between about 340 and about 500° F., preferably below about 425° F., and relatively low pressures of not more than about 50 pounds per square inch and preferably about atmospheric pressure are employed. The space velocity should be in the general vicinity of between about 50 and 1500 volumes of gas per hour per volume of space occupied by the catalyst. Approximately 60 to 70% conversion of carbon monoxide is effected in the cobalt catalyst synthesis reactor 18. At this conversion, the optimum quantity of olefinic hydrocarbons is produced and the residual carbon monoxide is converted in the parallel iron synthesis catalyst reactor 17.

The synthesis product from reactor 18 is withdrawn via line 28 and introduced into a recovery system schematically represented at 29. This recovery system ordinarily can comprise means for cooling the product to effect a separation between gaseous and liquid products, but any type of separation and recovery means may be used. The liquid products, including hydrocarbons and water, together with oxygenated compounds, are illustrated as being withdrawn from the recovery system 29 via line 30 for further separation and processing. This further separation and processing can be effected in the same equipment as that used on the corresponding fractions recovered in line 23 from the parallel iron synthesis catalyst reactor 17. However, the cobalt catalyst and iron catalyst reactors can be operated to produce predominantly either olefins or paraffins and the paraffins can be isomerized and then alkylated with the olefins. Likewise, it is contemplated that gasoline fractions recovered separately from the iron and cobalt synthesis can be blended to yield a product of increased storage stability. The blended gasoline fractions can be treated by contacting with bauxite in the vapor phase at 700° to 750° F. at a space velocity of 1 to 10 liquid volumes of hydrocarbon per volume of catalyst per hour. This accomplishes a conversion of the oxygen compounds to water and hydrocarbons and simultaneously isomerizes the olefins to a higher octane number level.

If desired, at least a portion of the synthesis water withdrawn from the product recovery systems can be supplied to the reformer 11 for reaction with additional methane and carbon dioxide to produce further quantities of make gas. The gaseous products withdrawn from the recovery system 29 via line 19 comprise a substantial proportion of carbon monoxide and this gas is supplied to the iron catalyst synthesis reactor 17 thereby increasing the ratio of carbon monoxide to hydrogen in the make gas supplied by line 15 to the reactor 17. As discussed above, substantial conversion of carbon monoxide is effected in the iron catalyst synthesis reactor 17.

The flow sheet merely illustrates the parallel process schematically and it should be clearly understood that pumps, compressors, valves, meters, and the like have been omitted for clarity, but their use is contemplated wherever necessary, as good engineering practice dictates.

From the above detailed description, it will be apparent that we have attained the objects of our invention and have provided an improved process employing parallel units to effect the optimum conversion of hydrogen and carbon monoxide to hydrocarbon products having more than one carbon atom to the molecule and having high proportions of olefins. The parallel operation affords economic advantages which cannot be obtained with either catalyst system alone using the make gas normally produced by the reforming of methane. Likewise, each catalyst system supplements the other and utilizes the residual feed gases to improve the extent of conversion and the character of products obtainable from given make gas. These and other features of our system cooperate to produce a novel and useful system not heretofore available.

The specific example described in more or less detail is for the purpose of illustration only and it should be understood that our invention is not limited thereto since other modifications and advantages will become apparent to those skilled in the art in view of the above description.

We claim:

1. In the process of converting a gas mixture containing hydrogen and carbon monoxide initially in a ratio of at least 5:3, the steps which include contacting one portion of the total gas mixture with an iron type catalyst at a pressure above about 5 atmospheres and a temperature above about 400° F., contacting another portion of the total gas mixture with a cobalt type catalyst in a parallel reaction zone at about atmospheric pressure and at a temperature between about 340 and 500° F., separately withdrawing reaction products from said parallel reaction zones recovering from the reaction products withdrawn from the iron catalyst synthesis a residual gas mixture including hydrogen and carbon dioxide, said residual gas mixture having a higher proportion of hydrogen to carbon monoxide than said total gas mixture separating from the reaction products of the cobalt catalyst synthesis a gaseous fraction relatively richer in carbon monoxide than said total initial gas mixture, supplying at least a portion of the hydrogen-rich residual gas from said iron catalyst synthesis to said cobalt catalyst synthesis, and supplying substantially all of the carbon monoxide recovered from the cobalt catalyst synthesis to said iron catalyst synthesis.

2. The process of synthesizing hydrocarbons from hydrogen and carbon monoxide mixtures produced by converting hydrocarbons with carbon dioxide and oxygen in a substantially thermally balanced reaction which includes the steps of splitting a stream of hydrogen and carbon monoxide gas mixture into substantially equal portions, reacting one portion of said total gas mixture over a cobalt synthesis catalyst, reacting another portion of said total gas mixture over an iron synthesis catalyst, recovering residual gases from each of said synthesis steps, supplying residual gas from the cobalt synthesis catalyst zone to said iron catalyst synthesis zone, recovering separate streams of carbon dioxide and hydrogen-rich gas from the residual gases withdrawn from the iron catalyst synthesis step, supplying at least a portion of the said hydrogen-rich gas to said cobalt catalyst synthesis step and utilizing at least a portion of the said carbon dioxide to convert additional quantities of hydrocarbons into an initial gas mixture of hydrogen and carbon monoxide in a ratio of about 5:3, and supplying separate portions of the total gas mixture to said parallel synthesis zones.

EVERETT A. JOHNSON.
SAM B. BECKER.

REFERENCES CITED

The following references are of record in the file of this patent:

UNITED STATES PATENTS

| Number | Name | Date |
|---|---|---|
| 2,234,941 | Keith, Jr. | Mar. 11, 1941 |
| 2,244,710 | Kolbel | June 10, 1941 |
| 2,248,099 | Linckh et al. | July 8, 1941 |
| 2,417,164 | Huber, Jr. | Mar. 11, 1947 |

FOREIGN PATENTS

| Number | Country | Date |
|---|---|---|
| 515,037 | Great Britain | Nov. 24, 1939 |